United States Patent [19]

Nishimura et al.

[11] Patent Number: 5,387,368

[45] Date of Patent: Feb. 7, 1995

[54] OXYGEN-SCAVENGING COMPOSITION

[75] Inventors: Toshiaki Nishimura; Kazumi Tanaka; Masahiro Harada; Kiichiro Seki; Shuta Kihara, all of Hiratsuka, Japan

[73] Assignee: Mitsubishi Gas Chemical Company, Inc., Tokyo, Japan

[21] Appl. No.: 972,894

[22] Filed: Nov. 6, 1992

[30] Foreign Application Priority Data

Nov. 15, 1991 [JP] Japan .................. 3-300618

[51] Int. Cl.$^6$ .............................................. C09K 15/18
[52] U.S. Cl. ................................ 252/188.28; 252/394; 252/390; 252/384; 252/389.2; 525/371; 564/306
[58] Field of Search ............... 252/188.28, 394; 564/306

[56] References Cited

U.S. PATENT DOCUMENTS

| | | | |
|---|---|---|---|
| 3,551,200 | 12/1970 | Stivers | 117/232 |
| 5,021,515 | 6/1991 | Cochran et al. | 525/371 |
| 5,034,252 | 7/1991 | Nilsson et al. | 428/35.8 |
| 5,164,110 | 11/1992 | Haraer et al. | 252/188.28 |
| 5,183,590 | 2/1993 | Carter et al. | 252/392 |
| 5,194,478 | 3/1993 | Frandsen et al. | 524/398 |
| 5,281,360 | 1/1994 | Hong et al. | 252/188.28 |

FOREIGN PATENT DOCUMENTS

| | | |
|---|---|---|
| 3610053 | 10/1986 | Germany . |
| WO89/02709 | 4/1989 | WIPO . |

OTHER PUBLICATIONS

Toyoda Gosei Co., Ltd., Patent Abstracts of Japan—Unexamined applications C Field, vol. 14, No. 330, Jul. 16, 1990, p. 164 C 741.

Primary Examiner—Robert L. Stoll
Assistant Examiner—Joseph D. Anthony
Attorney, Agent, or Firm—Wenderoth, Lind & Ponack

[57] ABSTRACT

An oxygen scavenging composition comprising an intimate mixture of (A) a compound having a skeleton of the following formula (1),

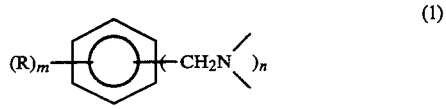

(1)

wherein R is a hydrogen atom or an alkyl group having 1 to 4 carbon atoms, m is an integer of 3 to 5, and n is an integer of 1 to 3, provided that m+n equals 6, (B) a transition metal compound and (C) a phosphorus compound. This composition is useful in a variety of fields requiring prevention of rust formation on metal, prevention of oxidation and decay of an organic substance, preservation of foods, prevention of insects and prevention of mold.

4 Claims, No Drawings

OXYGEN-SCAVENGING COMPOSITION

DETAILED DESCRIPTION OF THE INVENTION

The present invention relates to an oxygen-scavenging composition. More specifically, it relates to an oxygen-scavenging composition usable in a variety of fields requiring prevention of oxygen-induced rust on metal, prevention of oxidation and decay of an organic substance and foods, prevention of insects and mold.

It is well known that oxygen in air oxidizes metal, and oxidizes and deteriorates organic substances and foods. It is also well known that the oxidation and deterioration, for example, of an organic substance can be prevented by incorporating a so-called antioxidant such as a phenol compound, an amine compound, a sulfur compound or the like.

As a method of preventing the oxidation of metal, there is known a method in which a metal surface is coated with other metal or an organic polymer material which is hardly oxidized, such as a coating composition or a plastic film, to physically shut off water and oxygen, or in which a metal surface is protected by coating it with a metal having greater ionization tendency.

The coating composition used for the above purpose includes an alkyd coating composition, an epoxy resin coating composition, a urethane coating composition, a chlorinated rubber coating composition, an acrylic coating composition and an organic or inorganic zinc-rich paint.

The above plastic film Includes films of polyethylene, polypropylene, nylon, polyester, polyvinylidene chloride and polyvinyl chloride. These are used alone or in combination.

Further, Japanese Laid-Open Patent Publication No. 500,846/1990 proposes a method of enhancing an oxygen-shielding effect, in which a metal catalyst is incorporated into an oxygen-shielding polymer material, particularly into a polymer material which is liable to be oxidized.

On the other hand, the liability of specific metals to be oxidized is utilized. That is, metals which are liable to be oxidized are powdered and placed in a container formed from a material having low oxygen permeability for the purpose of preserving foods, preventing insects and preventing mold.

It has been also proposed to use a free-oxygen absorber composed of a specific glycol, an alkaline compound and a transition metal compound for the above purposes.

As described above, in various industrial fields, a number of methods are proposed and put to practical use for preventing troubles which oxygen would cause. However, these methods have problems which remain to be solved.

For example, it is well known that the oxygen permeability of a coating composition and the oxidation of metal are closely related. In the above method of coating metal with a polymer material, tile permeation of oxygen cannot be sufficiently prevented with any one of the prior art coating materials.

Besides the above methods using polymer materials, there is a method in which oils and fats containing a rust-preventing agent such as an unsaturated organic carboxylic acid, its salt, a sulfonic acid salt, amine or amide Is coated on metal to prevent rust. However, the long-term rust-prevention effect is low since the adsorption strength of the rust-preventing agent onto metal is low.

There is also known a method in which a free-oxygen absorber composed mainly of an iron powder is placed in a container having barrier properties against oxygen to bring the interior of the container into an oxygen-free state for preventing oxidation-induced deterioration of foods and preventing occurrence of bacteria and mold. In some cases, however, the oxygen-shielding effect of the barrier material is insufficient, or the free-oxygen absorber requires the use of water in combination. Moreover, there may be a problem in that the contents of the container is contaminated with the iron powder.

In the method proposed by Japanese Laid-Open Patent Publication No. 500,846/1990 in which the oxygen-shielding effect is enhanced by incorporating a metal catalyst into a polymer material which is especially liable to be oxidized, the problem is that the oxygen-scavenging performance is not sufficient for some purposes.

It is an object of the present invention to provide an oxygen-scavenging composition comprising a novel composition.

It is another object of the present invention to provide a composition which has excellent oxygen absorption performance sufficient to overcome the above problems of the prior art.

Other objects and advantages of the present invention will be apparent from the following description.

According to the present invention, the above objects and advantages of the present invention are achieved by an oxygen-scavenging composition comprising an intimate mixture of (A) a compound having a skeleton of the following formula (1),

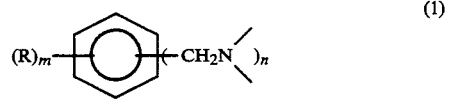

(1)

wherein R is a hydrogen atom or an alkyl group having 1 to 4 carbon atoms, m is an integer of 3 to 5, and n is an integer of 1 to 3, provided that m+n equals 6, (B) a transition metal compound and (C) a phosphorus compound.

Examples of the compound (A) having a skeleton of the formula (1) preferably include an amine of tile following formula (1)-a,

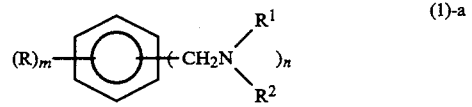

(1)-a wherein R, m and n are as defined above, and each of $R^1$ and $R^2$ is, independently of other, a hydrogen atom or an alkyl group having 1 to 2 carbon atoms, provided that when n is 2 or 3, a plurality of $R^1$s may be different or the same among them and a plurality of $R^2$s may be different or the same among them;

a salt or amide of an amine from the above formula (1)-a and an organic carboxylic acid; a Mannich base from an amine of the above formula (1)-a (wherein at least one of $R^1$ and $R^2$ is a hydrogen atom), a phenol and formaldehyde; an adduct of an amine of the above formula (1)-a and a compound having a polymerizable double bond; an adduct of an amine of the above formula (1)-a and an epoxy compound, or a cured product of this adduct; an Isocyanate of the following formula (1)-c,

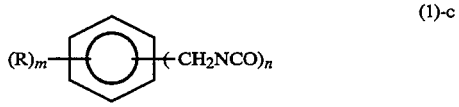
(1)-c wherein R, m and n are as defined above, or a polyurethane derived therefrom; and an epoxy group-containing amine of the following formula (1)-d,

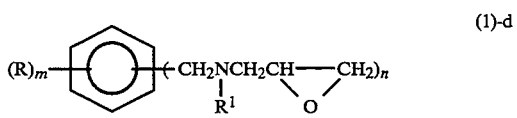
(1)-d wherein R, $R^1$, m and n are as defined above.

In the above formula (1), R is a hydrogen atom or an alkyl group having 1 to 4 carbon atoms, m is an integer of 3 to 5, and n is an integer of 1 to 3. Further, m+n equals 6, and a plurality of Rs may be the same or different.

The alkyl group having 1 to 4 carbon atoms may be linear or branched, and includes methyl, ethyl, n-propyl, iso-propyl, n-butyl, iso-butyl, sec-butyl and tert-butyl.

In the above formula (1)-a, R, m and n are as defined in the formula (1), and each of $R^1$ and $R^2$ is, independently of other, a hydrogen atom, methyl or ethyl. When n is 2 or 3, a plurality of $R^1$s may be the same or different among them and a plurality of $R^2$s may be the same or different among them.

Examples of the amine of the above formula (1)-a preferably include benzylamine, 3-methylbenzylamine, m-xylylenediamine, p-xylylenedimaine, N,N'-dimethyl-m-xylylenediamine, N,N,N',N'-tetramethyl-m-xylylenediamine, N,N'-dimethyl-p-xylylenediamine, N,N,N',N'-tetramethyl-p-xylylenediamine, N,N'-diethyl-m-xylylenediamine, N,N,N',N'-tetraethyl-m-xylylenediamine, N,N'-diethyl-p-xylylenediamine, N,N,N',N'-tetraethyl-p-xylylenediamine, and 1,3,5-tris-(aminomethyl)benzene.

Among the above amines of the formula (1)-a, more preferred is a diamine of the following formula (1)-b,

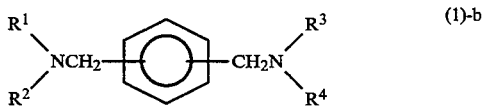
(1)-b wherein each of $R^1$, $R^2$, $R^3$ and $R^4$ is independently a hydrogen atom or an alkyl group having 1 to 2 carbon atoms.

Above all, particularly preferred is m-xylylenediamine.

Examples of the salt or amide from an amine of the formula (1)-a and an organic carboxylic acid include salts or amides from the above amines and organic carboxylic acids including mono carboxylic acids such as stearic acid, oleic acid, lauric acid and tall oil fatty acid or dicarboxylic acids such as adipic acid, sebacic acid and dimer acid. Particularly preferred is a salt or amide of m-xylylenediamine or p-xylylenediamine and the organic carboxylic acid.

Examples of the Mannich base from an amine of the above formula (1)-a (wherein at least one of $R^1$ and $R^2$ is a hydrogen atom), a phenol and formaldehyde include Mannich bases generally used as an epoxy resin curing agent and obtained by reacting amines such as m-xylylenediamine and p-xylylenediamine, phenols such as phenol, m-cresol and p-cresol and formaldehyde.

Examples of the adduct of an amine of the formula (1)-a and a compound having a polymerizable double bond include adducts of amines such as m-xylylendiamine and p-xylylenediamine with vinyl compounds such as acrylonitrile and methyl (meth)acrylate.

Examples of the adduct of an amine of the formula (1)-a with an epoxy compound and the cured product thereof include adducts of amines such as m-xylylenediamine and p-xylylenediamine with epoxy compounds such as a bisphenol A type epoxy resin, a bisphenol F type epoxy resin and butyl glycidyl ether, and cured products obtained by curing them with a curing agent.

Examples of the Isocyanate of the formula (1)-c and the polyurethane derived therefrom include isocyanate compounds typified by m-xylylenediisocyanate and p-xylylenediisocyanate, and polyurethanes derived from these as an isocyanate component.

Examples of the epoxy group-containing amine of the formula (1)-d include tetraglycidyl-m-xylylenediamine and tetraglycidyl-p-xylylenediamine. As the epoxy group-containing amine, particularly preferred is tetraglycidyl-m-xylylenediamine.

The oxygen-scavenging composition of the present invention further contains (B) a transition metal compound and (C) a phosphorus compound in addition to the above compound (A).

The transition metal compound is preferably selected from carboxylic acid salts and chelate compounds of transition metals.

Specifically, examples of the transition metal compound include monocarboxylic acid salts and dicarboxylic acid salts such as acetates, stearates and naphthenates of transition metals such as cobalt, manganese, copper, iron, nickel and rhodium, and chelate compounds of these transition metals.

Among the above transition metal compounds, particularly preferred are cobalt acetate, cobalt stearate, cobalt acetylacetonate, iron acetylacetonate and manganese acetate.

The above transition metal compounds may be used alone or in combination. The amount of the transition metal compound as a metal component based on the entire amount of the composition is preferably 1 to 10,000 ppm, more preferably 10 to 1,000 ppm.

The phosphorus compound is preferably selected from phosphates, phosphites and hypophosphites. Specific examples of the phosphorus compound include trisodium phosphate, tripotassium phosphate, disodium hydrogenphosphate, dipotassium hydrogenphosphate, sodium dihydrogenphosphate, potassium dihydrogenphosphate, sodium phosphite, potassium phosphite, sodium hypophosphite, potassium hypophosphite and iron phosphate.

The above phosphorus compounds may be used alone or in combination. The amount of the phosphorus compound as a phosphorus component based on the entire amount of the composition is preferably 1 to 10,000 ppm, more preferably 10 to 1,000 ppm.

The oxygen-scavenging composition of the present invention comprises an intimate mixture of the above compounds (A), (B) and (C).

The method of preparing the composition of the present invention differs to some extent depending upon the properties of the composition. Basically, however, the transition metal compound and the phosphorus compound may be added together or separately, and may be added in any order.

For example, when the compound (A) is a thermoplastic resin, It is preferred to melt-mIx the thermoplastic resin (A), the transition metal compound (B) and the phosphorus compound (C) with an apparatus with which a thermoplastic resin can be melt-kneaded, such as an extruder and a kneader.

For example, when the compound (A) is a thermoplastic resin and is mixed with other thermoplastic resin, it is preferred to preliminarily melt-mix the compound (A), the transition metal compound (B) and the phosphorus compound (C), and then mix the resultant mixture with other thermoplastic resin.

Further, there may be employed another method in which the transition metal compound (B) and the phosphorus compound (C) are mixed (dry-blended) with the compound (A) and other thermoplastic resin at a temperature below the melting points of these two resins, and then resultant mixture is melt-kneaded with an extruder or a kneader.

Examples of the other thermoplastic resin above include polyesters such as polyethylene terephthalate and polybutylene terephthalate; polyolefins such as polypropylene, polyethylene, maleic acid-modified polypropylene, malelc acid-modified polyethylene and poly-4-methylpentene-1; polyamides such as nylon 6 and nylon 66; polycarbonate; polyvinyl chloride; and polyvinyl acetate.

The composition of the present invention may naturally be incorporated into thermosetting resins such as an epoxy resin, a phenolic resin, a melamine resin, an unsaturated polyester resin and a polyurethane resin.

The composition of the present invention may contain, as required, a variety of inorganic and organic compounds for improving its contact with oxygen and flowability, or as a liquid carrier.

According to the present invention, the above oxygen-scavenging composition comprising the compound (A), the transition metal compound (B) and the phosphorus compound (C) exhibits greatly enhanced oxygen-scavenging performance over conventional oxygen-scavenging compositions, and effectively performs prevention of rust formation on metal, preventlon of oxidation and decay of an organic substance, preservation of foods, prevention of insects and prevention of mold in many fields.

The features and effects of the present invention will be described hereinafter by reference to the Examples.

EXAMPLE 1

There was used an oxygen absorption experiment apparatus having a 30 ml gas buret connected to a mercury reservoir, a 100 ml Erlenmeyer flask having a gas sampling outlet and a sample feed inlet, a temperature-controlling water bath and a magnetic stirrer.

The above apparatus was placed in a constant-temperature chamber at 25° C. The apparatus was opened and the height of the mercury reservoir was adjusted so that the mercury level in the gas buret came to about 10 ml.

The flask was charged with 27.2 g of m-xylylenediamine, and the gas buret and the flask were connected and tightly closed to each other.

The flask was placed in the water bath set at 40° C. and positioned on the magnetic stirrer, and the m-xylylenediamine was stirred for at least 2 hours until the air amount in the flask became a constant level.

Then, cobalt acetate or trisodium phosphate in a predetermined amount shown in Table 1 was charged through the sample feed inlet. After 72 hours from this point of feeding, a gas in the apparatus was measured for its volume with the gas buret, and oxygen in the gas was also measured for its concentration by gas chromatography to determine an amount of absorbed oxygen.

Table 1 shows the result.

COMPARATIVE EXAMPLES 1-3

Example 1 was repeated except that none of the transition metal compound and the phosphorus compound used in Example 1 were used or except that one of these compounds in a determined amount shown in Table 1 was used.

Table 1 shows the results.

TABLE 1

| | Example | Comparative Example | | |
|---|---|---|---|---|
| | 1 | 1 | 2 | 3 |
| Transition metal concentration in composition | | | | |
| Cobalt concentration (ppm) | 200 | 0 | 200 | 0 |
| Phosphorus concentration (ppm) | 400 | 0 | 0 | 400 |
| Oxygen absorption (ml) | 7.2 | 0.5 | 3.5 | 0.2 |

The above concentrations of cobalt and phosphorus in Table 1 are weight concentration ratios based on m-xylylenediamine in a composition.

Table 1 clearly shows that the three-component composition containing m-xylylenediamine, cobalt acetate and trisodium phosphate, used in Example 1, is excellent in oxygen absorption performance over the other systems used in Comparative Examples 1 to 3.

EXAMPLE 2

Similarly to Example 1, cobalt stearate and sodium hypophosphite were added to 20 g of tetraglycidyl-m-xylylenediamine (trade name: Tetrad X, supplied by Mitsubishi Gas Chemical Company, Inc.) such that the cobalt concentration based on the tetraglycidyl-m-xylylenediamine was 500 ppm and that the phosphorus concentration based on the same was 150 ppm. The oxygen absorption was measured in the same manner as in Example 1.

As a result, the oxygen absorption amount was 18.0 ml.

COMPARATIVE EXAMPLE 4

Similarly to Example 1, trisodium phosphate was added to 27.2 g of m-xylylenediamine such that the phosphorus concentration based on the m-xylylenediamine was 400 ppm, and the oxygen absorption was measured.

As a result, the oxygen absorption amount was 0.2 ml.

COMPARATIVE EXAMPLE 5

Example 2 was repeated except that the tetraglycidyl-m-xylylenediamine was replaced with a bisphenol A type epoxy resin (trade name: Epikote 828, supplied by Yuka Shell Epoxy Kabushiki Kaisha).

In this Comparative Example 5, no absorption of oxygen was observed.

EXAMPLE 3

In a 500 ml brown bottle, tetraglycidyl-m-xylylenediamine (trade name: Tetrad X, supplied by Mitsubishi Gas Chemical Company, Inc.) and anhydrous methyl Nadic acid were mixed in a weight ratio of 100:37. Then, cobalt stearate and sodium hypophosphite were added such that the amount as cobalt in the resin composition was 500 ppm and that the amount as phosphorus in the composition was 150 ppm. The resultant mixture was stirred in an experimental small-sized dissolver for about 10 minutes to obtain an epoxy resin composition.

20 Grams of the above-obtained composition was placed In a 500 ml brown bottle, and allowed to stand at room temperature for 24 hours to cure it. The bottle was tightly closed, and allowed to stand in a hot-air dryer for 40 days. Then, the oxygen absorption was measured, and the measured amount of oxygen absorption was 2.4 ml.

COMPARATIVE EXAMPLE 6

Example 3 was repeated except that neither cobalt stearate nor sodium hypophosphite was added.

As a result, the amount of oxygen absorption was 0.05 ml.

EXAMPLE 4

Pellets of poly-m-xylylenediamine (hereinafter referred to as NMXD6, relative viscosity: 2.0) and sodium hypophosphite monohydrate were mixed such that the phosphorus concentration in NMXD6 was 230 ppm, and the mixture was mix-melted and extruded at a temperature between 260° C. and 270° C. to re-pelletize it.

Then, 25 parts by weight of pellets of NMXD6 containing phosphorus and 75 parts by weight of cobalt stearate and low-density polyethylene (trade name: Mitsui-Nisseki Polyethylene, Grade F41, supplied by Nippon Petrochemlcals Co., Ltd.) were mixed such that the cobalt concentration based on the entire resin amount (hereinafter referred to as "in the sheet") was 200 ppm. And, the mixture was formed into a sheet at a temperature between 260° C. and 270° C. with an extruder (supplied by Toyo Seiki Co., Ltd, model: Laboplastmill, cylinder diameter: 20 mm, Screw form: full flight, single screw).

The resultant sheet formed from NMXD6, the phosphorus compound, the cobalt compound and polyethylene and having a thickness of 400 μm was cut to prepare sample sheets having a width of 120 mm and a length of 150 mm. The so-prepared five sample sheets were placed in a three side sealed bag having a heat-sealing layer and having a length of 250 mm and a width of 200 mm (inner layer: polyethylene, outer layer: aluminum foil), and after the air amount in the bag was adjusted to 250 ml, the bag was sealed.

The bag was allowed to stand at 23° C. for 30 days, and then the gas in the bag was sampled with a syringe and measured for the oxygen concentration (by volume) in the bag with an oxygen concentration meter (model: LC-700F, supplied by Toray Engineering K.K.).

The oxygen absorption (ml/m$^2$) was calculated by the following equation.

Oxygen absorption = $[V_1 \times (C_1 - C_2)]/[(1-C_2) \times S]$ wherein:

$V_1$ = initial air amount (ml)

$C_1$ = initial oxygen concentration (0.205 ml/ml)

$C_2$ = Oxygen concentration (ml/ml) after a predetermined period of time

S = Surface area of sample sheets (m$^2$)

Table 2 shows the oxygen concentration in the bag and oxygen absorption amount by the sheet after 30 days.

EXAMPLE 5

50 Parts by weight of pellets of NMXD6 containing sodium hypophosphite monohydrate in such an amount that the phosphorus concentration in NMXD6 was 230 ppm, and 50 parts by weight of iron acetylacetonate and low-density polyethylene (trade name: Mitsui-Nisseki Polyethylene, Grade F41, supplied by Nippon Petrochemlcals Co., Ltd.) were mixed such that the iron concentration in the sheet was 190 ppm. The resultant mixture was formed into a sheet with an extruder at a temperature between 260° C. and 270° C. in the same manner as in Example 4. The resultant sheet formed from NMXD6, the iron compound and the polyethylene was examined on its oxygen absorption in the same manner as in Example 4.

Table 2 shows the results.

COMPARATIVE EXAMPLE 7

25 Parts by weight of NMXD6 which was the same as used in Example 4 but not mixed with the phosphorus compound, and 75 parts by weight of cobalt stearate and low-density polyethylene (trade name: Mitsui-Nisseki Polyethylene, Grade F41, supplied by Nippon Petrochemlcals Co., Ltd.) were mixed such that the cobalt concentration in the sheet was 200 ppm. The resultant mixture was formed into a sheet at a temperature between 260° C. and 270° C. in the same manner as in Example 4.

The resultant sheet formed from NMXD6, the cobalt compound and polyethylene and having a thickness of 400 μm was cut to prepare sample sheets having a width of 120 mm and a length of 150 mm. The so-prepared sample sheets were placed in a three side sealing bag having a heat-sealed layer and having a length of 250 mm and a width of 200 mm (inner layer: polyethylene, outer layer: aluminum foil), and after the air amount in the bag was adjusted to 250 ml, the bag was sealed.

After 30 days, the gas in the bag was sampled with a syringe and measured for the oxygen concentration. Table 2 shows the oxygen concentration in the bag and the oxygen absorption amount by the sheet after 30 days.

Table 2 shows that the oxygen absorption amount by this sheet was very small.

TABLE 2

|  | Example | | Comparative Example |
|---|---|---|---|
|  | 4 | 5 | 7 |
| Transition metal concentration in sheet | | | |
| Cobalt concentration (ppm) | 200 | — | 200 |
| Iron concentration (ppm) | — | 190 | — |

TABLE 2-continued

| | Example | | Comparative Example |
|---|---|---|---|
| | 4 | 5 | 7 |
| Phosphorus concentration in NMXD6 (ppm) | 230 | 230 | — |
| Oxygen concentration in bag (%) | 2.1 | 11.2 | 20.3 |
| Oxygen absorption amount by sheet (ml/m²) | 260 | 143 | 3 |

What is claimed is:

1. An oxygen-scavenging composition comprising an intimate mixture of (A) an effective oxygen-scavenging amount of a compound of the following formula (I)-b

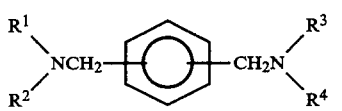

wherein each of $R^1$, $R^2$, $R^3$ and $R^4$ is independently selected from the group consisting of a hydrogen atom and an alkyl group having 1 to 2 carbon atoms, (B) a transition metal compound and (C) a phosphorus compound, said transition metal compound (B) being present, based on the entire amount of the composition, in an amount of 1 to 10,000 ppm as a transition metal and said phosphorus compound (C) being present, based on the entire amount of the composition, in an amount of 1 to 10,000 ppm as phosphorus.

2. A composition according to claim 1, wherein the phosphorus compound (C) is a member selected from the group consisting of phosphate, phosphite and hypophosphite.

3. A composition according to claim 1 wherein the transition metal compound (B) is a member selected from the group consisting of a carboxylic acid salt and a chelate compound of a transition metal.

4. A composition according to claim 3, wherein the transition metal is a member selected form the group consisting of iron and cobalt.

* * * * *